United States Patent [19]

Oltendorf et al.

[11] Patent Number: 4,651,076
[45] Date of Patent: Mar. 17, 1987

[54] POWER MAXIMIZING CIRCUIT FOR STEPPER MOTORS

[75] Inventors: Norman E. Oltendorf, Algonquin; Michael Marhoefer, Chicago, both of Ill.

[73] Assignee: Bodine Electric Company, Chicago, Ill.

[21] Appl. No.: 741,553

[22] Filed: Jun. 5, 1985

[51] Int. Cl.⁴ .............................................. H02P 8/00
[52] U.S. Cl. .................................... 318/696; 318/685
[58] Field of Search ................. 318/685, 696; 323/282

[56] References Cited

U.S. PATENT DOCUMENTS

| | | | |
|---|---|---|---|
| 3,424,961 | 1/1969 | Leenhouts | 318/138 |
| 3,432,737 | 3/1969 | Hunter et al. | 321/2 |
| 3,505,579 | 4/1970 | Leehouts et al. | 318/138 |
| 3,525,924 | 8/1970 | Atterholt | 323/282 |
| 3,665,284 | 5/1972 | Loyzim | 318/696 |
| 3,750,000 | 7/1973 | Bruckner et al. | 318/696 |
| 3,809,991 | 5/1974 | Loyzim | 318/696 |
| 3,812,413 | 5/1974 | Keidl | 318/696 |
| 3,967,179 | 6/1976 | Loyzim | 318/696 |
| 4,031,477 | 6/1977 | Togo et al. | 318/685 |
| 4,127,801 | 11/1978 | Leehouts | 318/696 |
| 4,540,928 | 9/1985 | Marhoefer | 318/696 |

Primary Examiner—William M. Shoop, Jr.
Assistant Examiner—Saul M. Bergmann
Attorney, Agent, or Firm—Allegretti, Newitt, Witcoff & McAndrews, Ltd.

[57] ABSTRACT

A power maximizing circuit for a stepper motor employing a switching regulator that conducts current to a variable voltage supply until a predetermined voltage is attained. The predetermined voltage is varied to achieve resonance compensation.

8 Claims, 2 Drawing Figures

POWER MAXIMIZING CIRCUIT FOR STEPPER MOTORS

TECHNICAL FIELD AND BACKGROUND

The technical field of the present invention is stepper motors, and more particularly, is power maximizing circuits for such motors.

A stepper motor provides controllable speed or position in response to input step pulses commonly applied from an appropriate control circuit. Since the stepper motor increments in a precise amount with each step pulse, it converts digital information, as represented by the input step pulses, to corresponding incremental rotation. By increasing the rate of the step pulses, it is possible to increase the speed of the motor.

Since stepper motors have been in existence, there has been a continuous attempt to obtain more power from the motor by developing higher torque at higher rates or speeds. Because of winding inductance, it becomes more difficult to rapidly conduct current into the windings as the step rate increases. Early stepper motor drive circuits included additional resistance in series with the motor windings so that the inductive time constant was reduced. Another method was to supply a higher voltage during the initial period of each phase change. Later controls introduced the concept of chopping the winding voltage at a two to five kilohertz rate that allowed elimination of the series resistance and improved drive system efficiency. Some systems have been known to use chopped frequencies into the 20 kilohertz range.

Another example of prior approaches to the problem is shown in U.S. Pat. No. 3,967,179 (Loyzim-June 29, 1976). Such prior circuits vary the voltage supplied to the motor windings using two separate circuits, a holding circuit for stand-still or low frequency operation, and a running circuit for higher stepping rates. Each of the circuits runs in synchronism with the step pulses and includes a pulse width modifier and adjustable monostable circuit. Such circuits are digital in nature and are confined to a change of state of the monostable circuit during each step pulse. In addition to this limitation, such circuts can accommodate only a limited number of discrete voltage levels to span the entire range of desired motor speeds. Experience has shown that the duplication of digital circuitry required by the prior circuits substantially increases the cost of the stepper motor as a whole. In addition, the Loyzim circuitry provides no feedback from the voltage suppied to the motor. As a result, the circuit cannot provide correction if the motor voltage is not at the desired level. In addition, such prior circuits provide no means of resonance compensation.

SUMMARY OF THE INVENTION

In order to achieve the foregoing objectives and to overcome the deficiencies of the digital circuitry designed in the past, the applicants have discovered a technique diametrically opposed to the design shown in U.S. Pat. No. 3,967,179. According to that patent, current is conducted to a variable voltage supply at least once during each stepper motor step pulse. Applicants have discovered that improved operation results by conducting current to a variable voltage supply independent of the stepper motor step pulses.

According to one embodiment of the invention, maximum power is obtained from a stepping motor by providing a source of DC voltage and a means for supplying a variable voltage to the motor. A reference voltage corresponding to a desired value of the variable voltage is generated and is compared to a feedback voltage generated from the variable voltage supplied to the motor. A switching regulator is switched to its conducting or non-conducting state depending on the results of the comparison. When the variable voltage is less than the desired value, the switching regulator allows current to be conducted from the source of DC voltage to the means for supplying a variable voltage until the reference voltage and feedback voltage obtain a predetermined relationship. For most applications, the conduction of current will continue until the reference voltage and feedback voltage are substantially equal.

According to another feature of the invention, the apparatus includes means for generating a velocity error signal representing rotor velocity variations about a nominal rotor speed. According to this feature, the reference voltage is altered so that the actual value of the variable voltage is inversely proportional to the velocity error signal. It has been discovered that the foregoing feature can compensate for resonance of a motor throughout a substantial range of operating speeds.

By using the foregoing techniques, maximum power may be obtained from a stepping motor with a degree of economy, simplicity and accuracy previously unobtainable.

BRIEF DESCRIPTION OF THE DRAWINGS

These and other advantages and features of the present invention will hereafter appear in connection with the accompanying drawings, wherein like numbers refer to like part throughout, and wherein.

DETAILED DESCRIPTION OF THE PREFERRED EMBODIMENT

Figure 1:
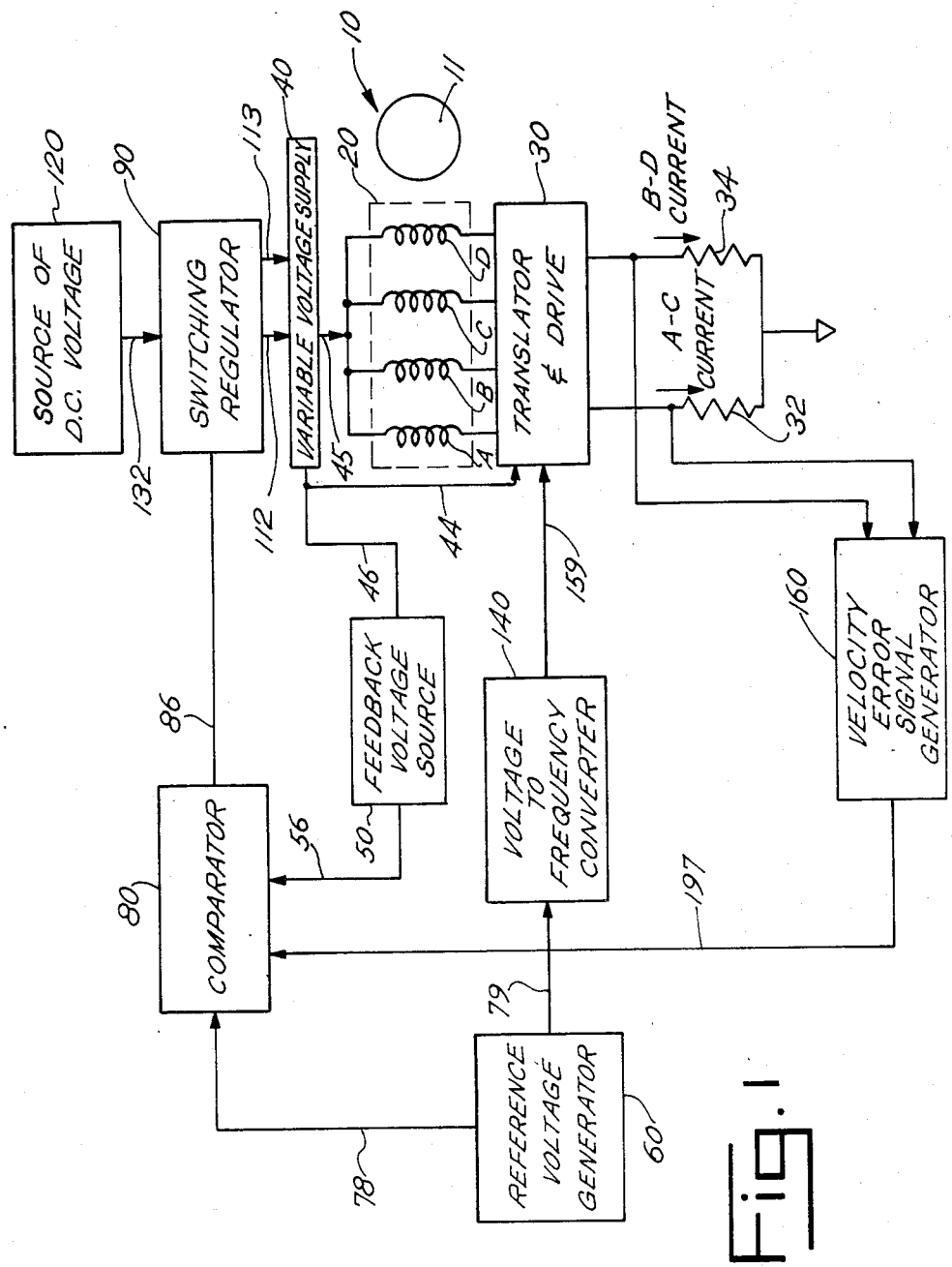
FIG. 1 is a schematic, block diagram representation of a preferred form of the present invention.
Figure 2:
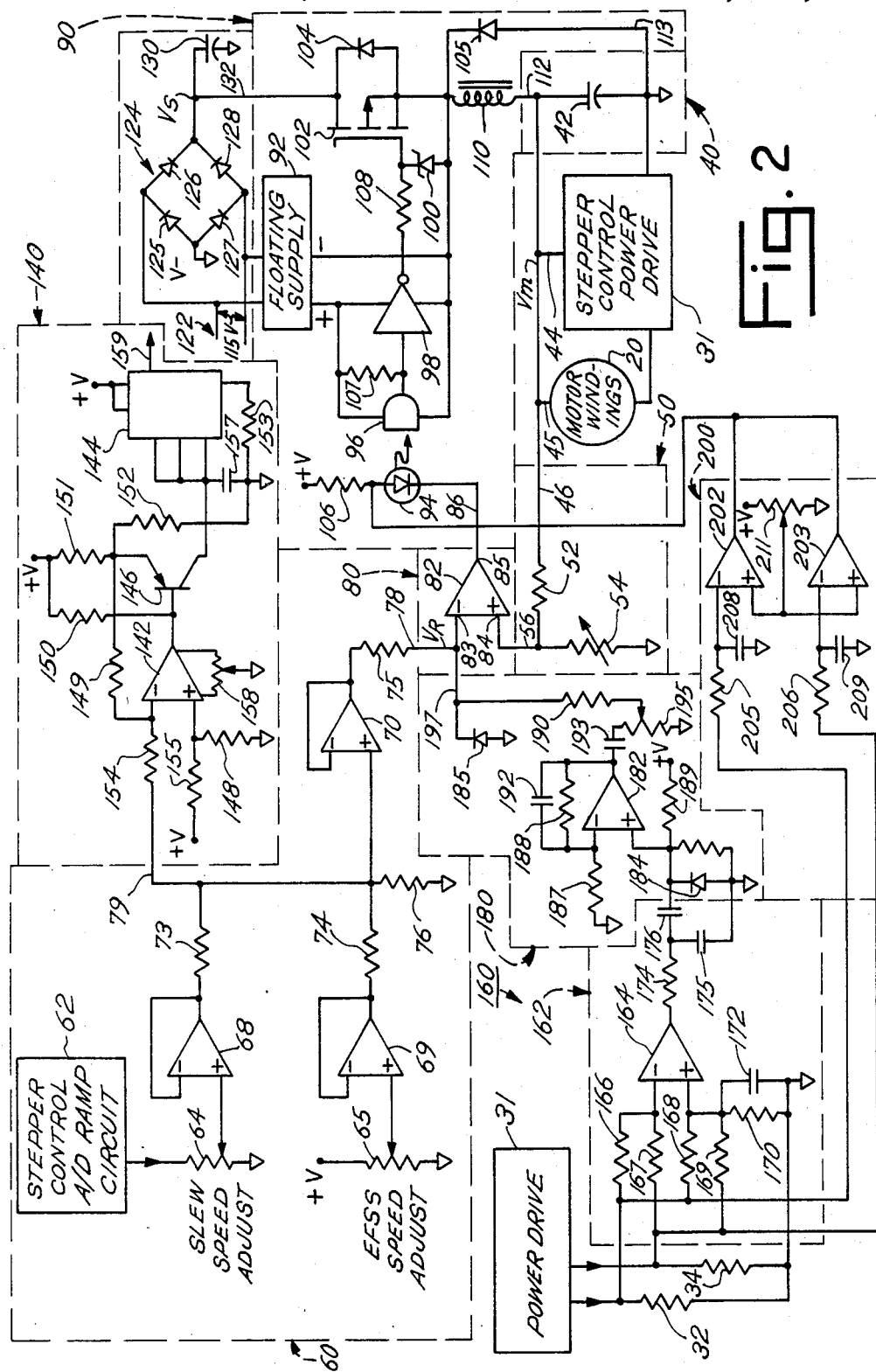
FIG. 2 is a schematic circuit diagram illustrating portions of the apparatus shown in FIG. 1.

Referring to FIGS. 1 and 2, a preferred form of the present invention may be used in connection with a conventional stepper motor 10 comprising a rotor 11 and stator windings 20 that may include, for example, windings A, B, C and D that conduct current when enabled by a conventional translator and drive circuit 30. The current for windings A and C is conducted to ground potential through a resistor 32 and the current for windings B and D is conducted to ground potential through a resistor 34. Translator and drive circuit 30 includes a power drive 31 (FIG. 2).

Referring to FIG. 1, a preferred form of power maximizing circuit for use in connection with the foregoing stepper motor basically comprises a varialbe voltage power supply 40, a feedback voltage source 50, a reference of voltage generator 60, a comparator 80, a switching regulator 90, a source of DC voltage 120, a voltage to frequency converter 140 and a velocity error signal generator 160.

Referring to FIG. 2, the variable voltage power supply 40 comprises a capacitor 42 and conductors 44–46. Capacitor 42 receives current from switching regulator 90 and charges to the variable voltage dictated by comparator 80. Capacitor 42 filters the output from switching regulator 90 and provides a well regulated DC voltage to stator windings 20 and stepper control power drive 31.

Feedback voltage source 50 is a passive voltage divider network comprising a resistor 52 and a potentiometer 54. The feedback voltage from source 50 is conducted to comparator 80 over a conductor 56.

Reference voltage generator 60 comprises a conventional stepper control ramp circuit 62, potentiometers 64 and 65, operational amplifiers 68–70, resistors 73–76, and conductors 78 and 79, connected as shown.

Conventionally, there are three regions of operation in a stepper motor in terms of speed. In a low frequency range, the stepper motor develops full value or maximum torque. This region normally is in the range of about 70 to 200 pulses per second, depending upon motor size.

The error free start-stop (EFSS) region normally falls within the range of about 120–1200 pulses per second, depending on motor size. In the EFSS region, the stepper motor can be started or stopped at any point without error.

The slew region is a relatively high speed region which generally is associated with acceleration and deceleration controls. Typically, the stepper motor is accelerated or ramped up to the slew rate and later is decelerated or ramped down from the slew rate to stop at the desired end position for the motor. In order to maintain synchronism between the input control pulses and the motor speed or position, it is common to accelerate the motor slowly from the error free start-stop rate to the slew rate by means of a stepper control circuit. Circuit 62 (FIG. 2) provides the DC control signals which accelerate and decelerate the motor in the foregoing manner. Since such circuits are well-known, circuit 62 need not be described in detail.

Comparator 80 comprises an operational amplifier 82 having an inverting input 83, a non-inverting input 84 and an output 85. The output from operational amplifier 82 is conducted to switching regulator 90 over a conductor 86. The output of comparator 80 switches between two voltage levels in a well-known manner. When the voltage on input 83 is greater than the voltage on input 84, output 85 is switched to a low voltage near zero volts. If the voltage on input 84 exceeds the voltage on input 83, output 85 is rapidly switched to a high voltage near the supply voltage for amplifier 82.

Switching regulator 90 comprises a floating supply 92, a light-emitting diode 94, a photosensitive transistor 96, an amplifier 98, a Zener diode 100, a field effect transistor 102, diodes 104 and 105, resistors 106–108, and air-gapped choke 110 and conductors 112 and 113. Floating supply 92 is necessary because the negative voltage for transistor 96 and amplifier 98 must be tied to choke 110 and must fluctuate relative to ground voltage. Such floating supplies are well-known in the art and form no part of this invention. The remaining supply voltages for the electronics marked +V in FIG. 2 are supplied by a conventional power supply referenced with respect to ground potential (not shown).

Source of DC voltage 120 comprises a source of 115 volt 60 cycle AC voltage 122, a full wave rectifier 124 comprising diodes 125–128, a capacitor 130 and a conductor 132. Capacitor 130 sufficiently smoothes the output from the full wave rectifier to provide a DC voltage of approximately 150 volts that is subject to some ripple voltage.

Voltage to frequency converter 140 comprises an operational amplifier 142, a monostable multivibrator 144, a transistor 146, resistors 148–155, a capacitor 157, a potentiometer 158 and an output conductor 159, connected as shown. In a well-known manner, converter 140 converts the DC voltage provided by circuit 62 to a corresponding pulse signal having a repetition rate corresponding to the desired pulse rate of the stepper motor. Multivibrator 144 may be the type known as the NE555. Alternatively, instead of converter 140, the system could employ a source of pulses having a repetition rate corresponding to the desired motor speed. The pulses would be converted to a corresponding DC voltage that would be used as reference voltage VR.

Velocity error signal generator 160 basically comprises a resonance detector 162 and an AC amplifier 180. Resonance detector 162 includes a comparator circuit consisting of an operational amplifier 164, a summing circuit consisting of resistors 166–170 and an integrating capacitor 172, an integrating circuit consisting of a resistor 174 and a capacitor 175, and a differentiating capacitor 176.

AC amplifier 180 comprises an operational amplifier 182, diodes 184 and 185, resistors 187–190, capacitors 192 and 193, a potentiometer 195 and a conductor 197, all connected as shown.

An over current protection circuit 200 comprises operational amplifiers 202 and 203, resistors 205 and 206, capacitors 208 and 209 and a potentiometer 211, all connected as shown.

The preferred embodiment of the invention is based on the concept of providing a voltage to the step motor such that the winding current can build up to a specified value within the period that a motor phase is "ON".

A formula has been developed that describes this voltage as a function of motor and circuit parameters:

$$V_m = V_w + V_{ce} + V_g + V_1$$

Where:
$V_m$ = Desired power supply voltage on conductor 45 for a predetermined step pulse rate;
$V_w$ = Step motor winding voltage at rated current;
$V_{ce}$ = Voltage drop across drive transistor(s) in circuit 31 at rated current;
$V_g$ = Motor generated voltage at the predetermined step rate;
$V_1$ = Voltage across inductor 110 needed to build the motor winding current to a specified value in time t.

$V_g$ is a measured parameter determined by driving the step motor from another motor at a known fixed speed and measuring the open circuit generated voltage. From this, the generated voltage constant is obtained.

$$V_g = (E_g/FK)$$

where $E_g$ is the generated voltage obtained at a speed equivalent to pulse rate FK. (For example, a 200 step per revolution step motor with a clock rate FK of 600 pulses per second would be running at 180 RPM).

$V_g$ assumes a linear relationship between $E_g$ and FK which is approximately the case.

$V_1$ is a constant that is related to motor winding inductance ($L_w$) and current ($I_r$). For most applications, $V_1$ equals approximately $I_r \times L \times f$, where: $I_r$ is specified rated motor current, L is motor winding inductance, and f = the stepping rate. The equation for $V_m$ now becomes:

$$V_m = V_w + V_{ce} + \left(\frac{E_g}{FK} + kLI_r\right)f$$

A multiplying constant (k) has been introduced to account for different step modes (2 φ ON, 1 φ ON, etc.) and the type of transient suppression method used in the power driver.

$k$ is defined as $(K_1/K_2)$ where $K_1$ is a circuit factor based on the suppression method and $K_2$ is a time factor based on the step mode.

If the motor winding current is a sawtooth shape that must build from $-I_r$ to a positive current, $K_1 = 2$. This is the case for an effective open suppression method that forces the current generated by the collapsing field into the other half of a bifilar wound motor phase.

For the case where diode suppression around the winding is used $K_1 = 1$, because motor winding current would start at $I_r = 0$.

$K_2$ defines the number of clock periods that each phase is "ON". $K_2 = 2$ for 2 phase ON operation, $K_2 = 1$ for 1 phase ON operation.

An example calculation for a step motor follows:
$E_g = 1.08$ volts at 180 RPM (f=600)
$L = 0.65$ mHy
$V_w = 1.3$ volts
$V_{ce} = 1.5$ volts
$I_r = 3.8$ A.

For 2 phase ON operation $K_2 = 2$ and the driver suppression method is such that $K_1 = 2$, thus:

$(K_1/K_2) = (2/2) = 1 = k$

From the above,
$V_m = 1.3 + 1.5 + ((1.08/600) + 1 \times 0.65 \times 10^{-3} \times 3.8)f$
At standstill, $f = 0$, therefore, $V_m = 1.3 + 1.5 = 2.8$ volts.
At 15,000 pulses per second, $V_m = 1.3 + 1.5 + (0.0018 + 0.00247)\ 15,000 = 66.85$ volts.

Circuit operation will be described with reference to FIGS. 1 and 2. A DC voltage on conductor 79 is converted to step pulses having an appropriate rate by voltage to frequency converter 140. The voltage on conductor 79 is summed with the voltage from potentiometer 65 by resistor 76 to produce a reference voltage VR for input 83 of comparator 80. A divided down motor supply voltage is connected to input 84 of comparator 80. According to the difference voltage between the comparator inputs 83 and 84, the output of comparator 80 is switched to a high or low voltage, causing the flow or interruption of current in LED 94 and switching transistor 96 on or off. The output of transistor 96 is amplified and turns power FET 102 on or off. Air-gapped choke 110 (to prevent magnetic saturation) and capacitor 42 form a filter resulting in a DC motor voltage $V_m$ on conductor 44 with a relatively low ripple content. Voltage $V_m$ varies in accordance with the established reference voltage VR on conductor 78. Neither the on/off periods or the frequency of FET 102 are fixed. This is an important feature that enables the circuit to self-adjust to the demands of the motor or a change in reference voltage VR.

There normally are practical limits for the FET on and off times due to circuit delays. These limits are imposed by the type of circuit shown in U.S. Pat. No. 3,967,179 that is locked to the motor step pulses and is switched once for each step pulse. In addition, the ciruitry shown in U.S. Pat. No. 3,967,179 allows only a limited number of discrete voltage levels. The applicants have discovered that allowing FET 102 to switch on and off in response to the motor demand for current avoids the limitations of the prior art and allows the motor voltage to be varied continuously from about 2 volts to about 140 volts with a main DC supply of 150 volts. Since the voltage variation is not limited to discrete levels, the exact needs of the motor can be met over a wide range of stepping rates.

In a typical application, the reference voltage on conductor 78 might be variable between 0.1 and 5 volts, 5 volts corresponding to a motor step rate of 15,000 pulses per second and 0.1 volt corresponding to 0 pulses per second. A reference voltage of 0.1 volt establishes a standstill motor voltage equal to $V_w + V_{ce}$ as described earlier. Potentiometer 158 in circuit 140 adjusts for a 0 pulse per second rate at the low (standstill) reference voltage input level.

For the example motor specified earlier, motor voltage $V_m$ should be about 66.85 volts at 15,000 step pulses per second. Assuming the reference voltage equals 5 volts, the motor voltage must be divided down to also equal 5 volts at this step pulse rate. If resistor 52 is a 1 megohm resistor, then the value of potentiometer 54 is determined from the following:

$(P54/P54 + 1\ \text{meg}) \times 66.85 = 5$ or potentiometer 54 = 80.8 kilohms. At standstill, the reference voltage would be 0.21 volts for a motor voltage ($V_m$) of 2.8 volts.

The applicants also have discovered that resonance compensation can be achieved to a remarkable degree by merely modifying reference voltage VR by the output of velocity error signal generator 160. Resonance detector 162 within generator 160 is described in co-pending U.S. application Ser. No. 06/591,020 filed Mar. 19, 1984 in the name of Michael Marhoefer and entitled "Closed Loop Resonance Compensation Circuit For Stepper Motors," now U.S. Pat. No. 4,540,928.

In the operation of the resonance compensation control circuit of FIG. 2, the voltage developed by the A–C winding current across resistance 32 is applied to resistances 166 and 168 of the summing circuit, and the voltage developed across resistance 34 is applied to resistances 167 and 169 of the summing circuit. The transient input or DC signal corresponding to the sum of the instantaneous winding currents is present at the positive terminal of comparator 164, while the reference input or long term DC signal corresponding to the averaged sum of the instantaneous winding currents is present at the negative terinal of comparator 164. This latter signal is provided by the resistances 168 and 169 connected with the capacitor 172 as an integrating circuit.

Comparator 164, which may be in the form of a known open loop gain stage, provides an output square wave signal having a pulse width corresponding to the difference between the compared currents. These square wave pulses are applied to an integrator circuit comprised of the resistance 174 and the capacitor 175 to provide, at the output of the integrator, an analog signal which represents rotor velocity variations about a nominal rotor speed. This analog signal is differentiated by capacitor 176, which also removes the DC voltage component, to result in a velocity error signal that is amplified by AC amplifier 180. The amplified velocity error signal is summed with the input signal from circuit 62 to modify voltage reference signal VR. The change in signal VR decreases or increases motor voltage $V_m$ as needed to compensate for motor resonance.

If the voltage across resistors 32 or 34 become sufficiently great compared to the reference voltage established by the potentiometer 211, either operational amplifier 202 or 203 will be switched to a state that prevents the operation of light-emitting diode 94, thereby preventing FET 102 from switching on. As a result, motor voltage $V_m$ is reduced, and the current through the motor windings is also reduced to a safe level.

It is apparent that modifications and changes may be made in operation and structure of the invention as described above without departing from the scope of the invention, as defined in the appended claims. The description has been made only by way of example and is not to be taken as limiting the invention.

What is claimed is:

1. A stepper motor having a rotor and motor windings;
   a source of DC voltage;
   means for supplying a variable voltage to said motor windings;
   means for generating a reference voltage corresponding to a desired value of voltage to be applied to said motor windings from said means for supplying a variable voltage;
   means for generating a feedback voltage corresponding to the actual value of voltage applied to said motor windings from the means for supplying a variable voltage;
   means for comparing said reference voltage to said feedback voltage; and
   switching regulator means for conducting current from the source of DC voltage to the means for supplying a variable voltage when the actual value of said voltage applied to said motor windings is less than the desired value of said voltage and for continuing to conduct curent until the reference voltage and feedback voltage attain a predetermined relationship, whereby maximum power is obtained from said motor.

2. Apparatus, as claimed in claim 1, wherein the means for generating a reference voltage comprises means for generating an analog voltage capable of representing the entire range of desired values of said variable voltage.

3. Apparatus, as claimed in claim 2, wherein the means for generating a feedback voltage comprises a voltage divider network.

4. Apparatus, as claimed in claim 3, wherein the means for comparing comprises:
   a comparator circuit comprising a first input responsive to the reference voltage, a second input responsive to the feedback voltage, and an output that switches between first and second discrete states.

5. Apparatus, as claimed in claim 4, wherein the switching regulator means comprises means switchable to a state of conduction in response to the first discrete state of the comparator circuit and switchable to a state of nonconduction in response to the second discrete state of the comparator circuit.

6. Apparatus, as claimed in claim 1, wherein the predetermined relationship is substantial equality.

7. Apparatus, as claimed in claim 1, further including means for compensating for resonance of the motor comprising means for generating a velocity error signal representing rotor velocity variations about a nominal rotor speed; and wherein the means for comparing is responsive to the velocity error signal so that increased velocity indicated by the velocity error signal decreases the actual value of the variable voltage and decreased velocity indicated by the velocity error signal increases the actual value of the variable voltage.

8. Apparatus, as claimed in claim 7, wherein the means for generating a velocity error signal comprises:
   comparator means connected to said stepper motor windings for comparing the averaged sum of the winding currents with the sum of the instantaneous winding currents and for generating a signal having a pulse width corresponding to the difference between the compared currents; and
   integrating and differentiating means connected to said comparator means for providing said velocity error signal.

* * * * *